US010839335B2

(12) United States Patent
Weisman et al.

(10) Patent No.: US 10,839,335 B2
(45) Date of Patent: Nov. 17, 2020

(54) CALL CENTER AGENT PERFORMANCE SCORING AND SENTIMENT ANALYTICS

(71) Applicant: Nice Ltd., Ra'anana (IL)

(72) Inventors: Hila Weisman, Tel Aviv (IL); Raanan Gonen, Beer Tuvia (IL); Rana Daoud, Nahariya (IL)

(73) Assignee: NICE LTD., Ra'anana (IL)

( * ) Notice: Subject to any disclaimer, the term of this patent is extended or adjusted under 35 U.S.C. 154(b) by 57 days.

(21) Appl. No.: 16/218,623

(22) Filed: Dec. 13, 2018

(65) Prior Publication Data
US 2020/0193353 A1  Jun. 18, 2020

(51) Int. Cl.
| | |
|---|---|
| G06Q 10/06 | (2012.01) |
| G10L 15/08 | (2006.01) |
| G10L 15/26 | (2006.01) |
| G06N 20/00 | (2019.01) |
| G06F 17/11 | (2006.01) |
| G10L 13/10 | (2013.01) |

(52) U.S. Cl.
CPC ....... *G06Q 10/06398* (2013.01); *G06F 17/11* (2013.01); *G06N 20/00* (2019.01); *G06Q 10/06393* (2013.01); *G10L 13/10* (2013.01); *G10L 15/083* (2013.01); *G10L 15/26* (2013.01); *G10L 2015/088* (2013.01)

(58) Field of Classification Search
CPC ......... G06Q 10/06395; G06Q 10/0639; G06Q 10/06398
See application file for complete search history.

(56) References Cited

U.S. PATENT DOCUMENTS

| | | | |
|---|---|---|---|
| 5,535,256 A * | 7/1996 | Maloney | G07C 1/10 379/111 |
| 8,364,509 B1 * | 1/2013 | Marr | G06Q 10/0639 705/7.11 |

(Continued)

OTHER PUBLICATIONS

Peng, Zeshan, Acoustic Feature-Based Sentiment Analysis of Call Center Data University of Missouri-Columbia, Dec. 2017 (Year: 2017)*

(Continued)

*Primary Examiner* — Scott L Jarrett
(74) *Attorney, Agent, or Firm* — Pearl Cohen Zedek Latzer Baratz LLP (57) ABSTRACT

A system and method for generating an agent behavioral analytics including extracting text-based features, sentiment-based features, and prosody-based features from tagged calls; training a machine learning behavioral model, based on the text-based features, the sentiment-based features, and the prosody-based features extracted from the tagged calls and an at least one score associated with an at least one behavioral metric of the tagged calls, to produce a trained machine learning behavioral model; extracting text-based features, sentiment-based features, and prosody-based features from an incoming call; and using the trained machine learning behavioral model to produce an at least one behavioral label for the agent in the incoming call for the at least one behavioral metric, based on the text-based features of the incoming call, the sentiment-based features of the incoming call and the prosody-based features of the incoming call.

18 Claims, 7 Drawing Sheets

(56) References Cited

U.S. PATENT DOCUMENTS

| | | | | |
|---|---|---|---|---|
| 8,463,595 | B1* | 6/2013 | Rehling | G06F 40/30 704/9 |
| 8,503,664 | B1* | 8/2013 | Kaufman | H04M 3/00 379/265.06 |
| 9,160,854 | B1* | 10/2015 | Daddi | H04M 3/5175 |
| 9,542,452 | B1* | 1/2017 | Ross | G06Q 10/06398 |
| 9,648,171 | B1* | 5/2017 | Eftekhari | H04M 3/5232 |
| 10,002,639 | B1* | 6/2018 | Gaeta | G11B 27/031 |
| 10,019,995 | B1* | 7/2018 | Abramovitz | G10L 25/51 |
| 10,244,209 | B1* | 3/2019 | Barnes | H04N 9/29 |
| 10,395,648 | B1* | 8/2019 | Benkreira | G06K 9/6263 |
| 10,490,191 | B1* | 11/2019 | Benkreira | G10L 15/265 |
| 10,616,413 | B1* | 4/2020 | Vyas | H04M 3/5175 |
| 2003/0144900 | A1* | 7/2003 | Whitmer | H04M 3/51 705/7.29 |
| 2006/0188085 | A1* | 8/2006 | Ricketts | G06Q 10/0639 379/265.06 |
| 2006/0233121 | A1* | 10/2006 | Cooper | H04M 3/5175 370/261 |
| 2007/0198323 | A1* | 8/2007 | Bourne | G06Q 10/06395 705/7.41 |
| 2007/0198330 | A1* | 8/2007 | Korenblit | G06Q 10/06393 705/7.42 |
| 2008/0004945 | A1* | 1/2008 | Watson | G06Q 30/02 705/7.42 |
| 2008/0167952 | A1* | 7/2008 | Blair | H04M 3/42221 379/265.07 |
| 2010/0138282 | A1* | 6/2010 | Kannan | G06Q 10/06398 705/7.42 |
| 2010/0250304 | A1* | 9/2010 | Whitaker | G06Q 10/0637 705/7.38 |
| 2012/0130771 | A1* | 5/2012 | Kannan | G06Q 10/06393 705/7.32 |
| 2012/0296642 | A1* | 11/2012 | Shammass | G10L 25/63 704/211 |
| 2013/0124257 | A1* | 5/2013 | Schubert | G06Q 30/02 705/7.29 |
| 2014/0067375 | A1* | 3/2014 | Wooters | G06F 40/40 704/9 |
| 2014/0140497 | A1* | 5/2014 | Ripa | H04M 3/5133 379/265.06 |
| 2014/0188457 | A1* | 7/2014 | Fink | G06F 40/30 704/9 |
| 2014/0188459 | A1* | 7/2014 | Fink | G06F 40/30 704/9 |
| 2015/0201077 | A1 | 7/2015 | Konig et al. | |
| 2015/0348570 | A1 | 12/2015 | Feast et al. | |
| 2015/0350438 | A1* | 12/2015 | Arslan | G10L 25/63 379/88.01 |
| 2015/0378561 | A1* | 12/2015 | Ollinger | G06Q 30/016 707/769 |
| 2016/0104180 | A1* | 4/2016 | Desautels | G06Q 30/0203 705/7.32 |
| 2016/0253999 | A1* | 9/2016 | Kang | G09B 19/04 704/249 |
| 2016/0358115 | A1 | 12/2016 | Gustafson et al. | |
| 2017/0270099 | A1* | 9/2017 | Gorny | G06Q 30/01 |
| 2017/0316345 | A1* | 11/2017 | Palmer | G06N 5/043 |
| 2017/0353605 | A1* | 12/2017 | Dumaine | G06Q 10/063112 |
| 2018/0011929 | A1* | 1/2018 | Unitt | G10L 15/1822 |
| 2018/0091654 | A1* | 3/2018 | Miller | H04M 3/42221 |
| 2018/0096278 | A1* | 4/2018 | Lev-Tov | G06F 16/9535 |
| 2019/0005421 | A1* | 1/2019 | Hammel | H04M 3/5183 |
| 2019/0180175 | A1* | 6/2019 | Meteer | G06N 3/08 |
| 2019/0310888 | A1* | 10/2019 | Lessin | G06N 5/043 |
| 2019/0385480 | A1* | 12/2019 | Suzuki | G06N 3/08 |
| 2020/0065825 | A1 | 2/2020 | Douglas | |
| 2020/0090087 | A1* | 3/2020 | Singh | G06Q 10/063114 |
| 2020/0193353 | A1 | 6/2020 | Weisman et al. | |

OTHER PUBLICATIONS

Raquel, Carlo et al., EMSys: An Emotion Monitoring System for Call Center Agents Sep. 2010 (Year: 2010)*

Ahmend, Abdelrahman et al., Agent Productivity Measurement in Call Center Using Machine Learning Proceedings of the International Conference on Advanced Intelligence and Infomatics, 2016 (Year: 2016).*

Chakraborty, Rupayan et al., Mining Call Center Conversations Exhibiting Similar Affective States 30th Pacific Asia Conference on Language, Information and Computation, Oct. 28-30, 2016 (Year: 2016).*

Giannakopoulos, Theodoros, "Feature Extraction", Aug. 24, 2018, p. 1-6, URL: https://github.com/tyiannak/pyAudioAnalysis/wiki/3.-Feature-Extraction.

Scikit-Learn, "Machine Learning in Python", Printed on Dec. 12, 2018, p. 1-3, URL: https://scikit-learn.org/stable/index.html.

Non-Final Office Action mailed in U.S. Appl. No. 16/271,846 dated Sep. 16, 2020.

* cited by examiner

CALL CENTER AGENT PERFORMANCE SCORING AND SENTIMENT ANALYTICS

FIELD OF THE INVENTION

Embodiments of the invention relate to technology for performing agent behavioral analytics, for example, for generating an agent profile.

BACKGROUND OF THE INVENTION

In modern call centers or contact centers, agent performance needs to be evaluated regularly. Currently, this evaluation is performed manually by supervisors, which need to listen to many calls and perform subjective evaluation of agents. This process is time-consuming, inefficient and highly subjective, leading to a difficulty in assessing agents across an enterprise. Thus, there is an ever-growing need to automatically evaluate agents for a variety of business needs such as work-force optimization, targeted coaching, etc.

SUMMARY

According to embodiments of the invention, there is provided a system and method for generating a behavioral metric for evaluating an agent in a call center. Embodiments may include: during a training phase: obtaining a plurality of audio recordings of tagged calls between customers and agents, and a plurality of scores associated with each tagged call of the plurality of tagged calls, each score grading a tagged call with respect to an attribute of a plurality of attributes; for each tagged call of the plurality of tagged calls: for each attribute of an at least one attribute, obtaining a score of the tagged call associated with the attribute; transcribing the call and calculating features of the tagged call based on the transcribed text of the tagged call and on the audio recordings of the tagged calls; training a machine learning model to produce a behavioral metric for each attribute of the at least one attribute of a future call, based on the features of the tagged calls and the at least one score associated with each of the tagged calls; during a runtime phase, for an incoming call: obtaining an audio recording of the call; transcribing the incoming call and calculating features for the incoming call based on the transcribed text of the incoming call and on the audio recording of the call; and using the trained machine learning model to produce a grade for the agent in the incoming call for each of the at least one attribute, based on the features of the incoming call.

According to embodiments of the invention, the features of a call of the tagged calls and the incoming call may include a reformulate dialog-act feature, wherein calculating the reformulate dialog-act feature may include: calculating an embedding vector in a word-embedding space for each word in the transcribed text of the call; dividing the text to utterances of the agent and utterances of the customer; summing the individual embedding vectors for each word in an utterance to obtain a vector representation of each utterance of a customer and the agent in the word-embedding space; producing a set of similarity scores by measuring a similarity of the vector representations of each pair of consecutive utterances of the agent and the customer, and calculating the reformulate dialog-act metric based on the similarity scores.

According to embodiments of the invention, measuring the similarity of the vector representations may be performed using a cosine similarity metric, for example:

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

where A and B are the two utterance vectors in a customer-agent utterance pair.

According to embodiments of the invention, calculating the reformulate dialog-act metric may include one of: calculating an average of the similarity measures; and taking a maximum.

According to embodiments of the invention, the features further may include at least one of: number of types, number of tokens, type-token ratio calculated by dividing a number of different words in the transcribed text of the call by a total number of words in the transcribed text of the call, average word length, average sentence length, number of words that could not be decoded during transcription, average confidence level, number of discourse markers, silence ratio calculated by dividing total silent time in the call by a total call duration, an agent activity ratio, calculated by dividing a total agent activity time by a total customer activity time in the call, a customer activity ratio, calculated by dividing a total customer activity time by a total customer activity time in the call, a plurality of silence percent per chunk features, wherein a silence percent per chunk feature is calculated by splitting the call to a plurality of chunks and calculating a feature for each chunk by dividing a total silent time in the chunk by a total chunk time, call duration, number of repeating unigrams words within a window, number of repeating unigrams part-of-speech tags within a window, number of filler words, number of repeating bigrams words within a window, and number of repeating bigrams part-of-speech tags within a window.

According to embodiments of the invention, the features may further include at least one of: repeat-phrase dialog-act feature calculated by dividing a number of matching unigram and bigrams in the pair by a total number of unigrams and bigrams in the pair, and back-channel dialog-act feature, wherein the back-channel dialog-act feature equals the number of utterances in which the agent says a word out of a list of back-channel words.

According to embodiments of the invention, the features of a call of the tagged calls and the incoming call may include sentiment-based features, wherein calculating the sentiment-based features may include generating an estimate of the sentiment per time in the call, wherein the sentiment-based features of the call may include at least one of: overall customer sentiment feature calculated by averaging the estimate of the sentiment of the customer per time across the call, a plurality of average sentiment per chunk features, calculated by splitting the call into a plurality of chunks and averaging the estimate of the sentiment per time in each chunk, and a plurality of adaptability features, wherein an adaptability feature is calculated by: finding an extremum in the estimate of the sentiment per time; constructing a feature vector for the agent speech within a time interval before and after the extremum; and measuring a similarity between the feature vector of the agent speech before the extremum and the feature vector of the agent speech after the extremum.

According to embodiments of the invention, measuring the similarity of the feature vector for the agent speech before the extremum and the feature vector for the agent speech after the extremum may be performed using a cosine similarity metric.

According to embodiments of the invention, the features of a call of the tagged calls and the incoming call may include prosody-based features.

Embodiments of the invention may include performing at least one of: generating goals for the agent according to the behavioral metric; and providing a coaching program for the agent based on the behavioral metric.

Embodiments of the invention may include presenting the behavioral metric of the agent to a supervisor.

According to embodiments of the invention, a system and method for generating an agent behavioral analytics, may include: extracting text-based features, sentiment-based features, and prosody-based features from tagged calls; training a machine learning behavioral model, based on the text-based features, the sentiment-based features, and the prosody-based features extracted from the tagged calls and an at least one score associated with an at least one behavioral metric of the tagged calls, to produce a trained machine learning behavioral model; extracting text-based features, sentiment-based features, and prosody-based features from an incoming call; and using the trained machine learning behavioral model to produce an at least one behavioral label for the agent in the incoming call for the at least one behavioral metric, based on the text-based features of the incoming call, the sentiment-based features of the incoming call and the prosody-based features of the incoming call.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention pertain, inter alia, to the technology of agent profiling (e.g., in a call center or a customer service center). Embodiments may provide an improvement to the technology of agent profiling for any suitable organization by for example improving and automating the process of performing agent behavioral analytics. Embodiments of the invention may provide significant insights to the behavior of agents without the need to listen to calls and annotate them manually. Embodiments of the invention may provide a unique method for performing agent behavioral analytics by training and using a machine learning (ML) model using text-based features, sentiment-based features and prosody-based features extracted from calls. The model may be trained in a training phase using tagged calls, e.g., calls that were associated with one or more behavioral labels, grades, scores or ratings that may grade the call with respect to one attribute of a set of attributes or behavioral metrics. Trained ML model may be used to perform behavioral analytics of incoming calls in a runtime phase. The behavioral analytics may include a plurality of behavioral metrics or attributes, and embodiments of the invention may provide a score or rating for each of these behavioral metrics or attributes for each analyzed call.

Embodiments of the invention may create a robust ML behavioral model which may predict or calculate an agent's score or scores, based on an audio recording of a call. In some embodiments a plurality of scores may be calculated by the ML behavioral model, each for a behavioral metric. Embodiments of the invention may take advantage of the complementary nature of two modalities of each call: an audio modality and a text modality, e.g., some of the features used by the ML behavioral model may be extracted directly from the audio file of the call, while others may be extracted from an automatically generated transcription of the call. Example features may include: detecting disfluencies, adaptability of language after change in sentiment etc. Embodiments of the invention may improve the performance of ML behavioral models for performing behavioral analytics by using novel features that are based theories of linguistics and psychology such as the number of unknown words, disfluency features, summarize and reformulate DA feature etc.

Additionally, the score generated by the ML behavioral model may be invariant across channels and domains and thus may be less subjective and more reliable than a score provided by a human annotator.

Figure 1:
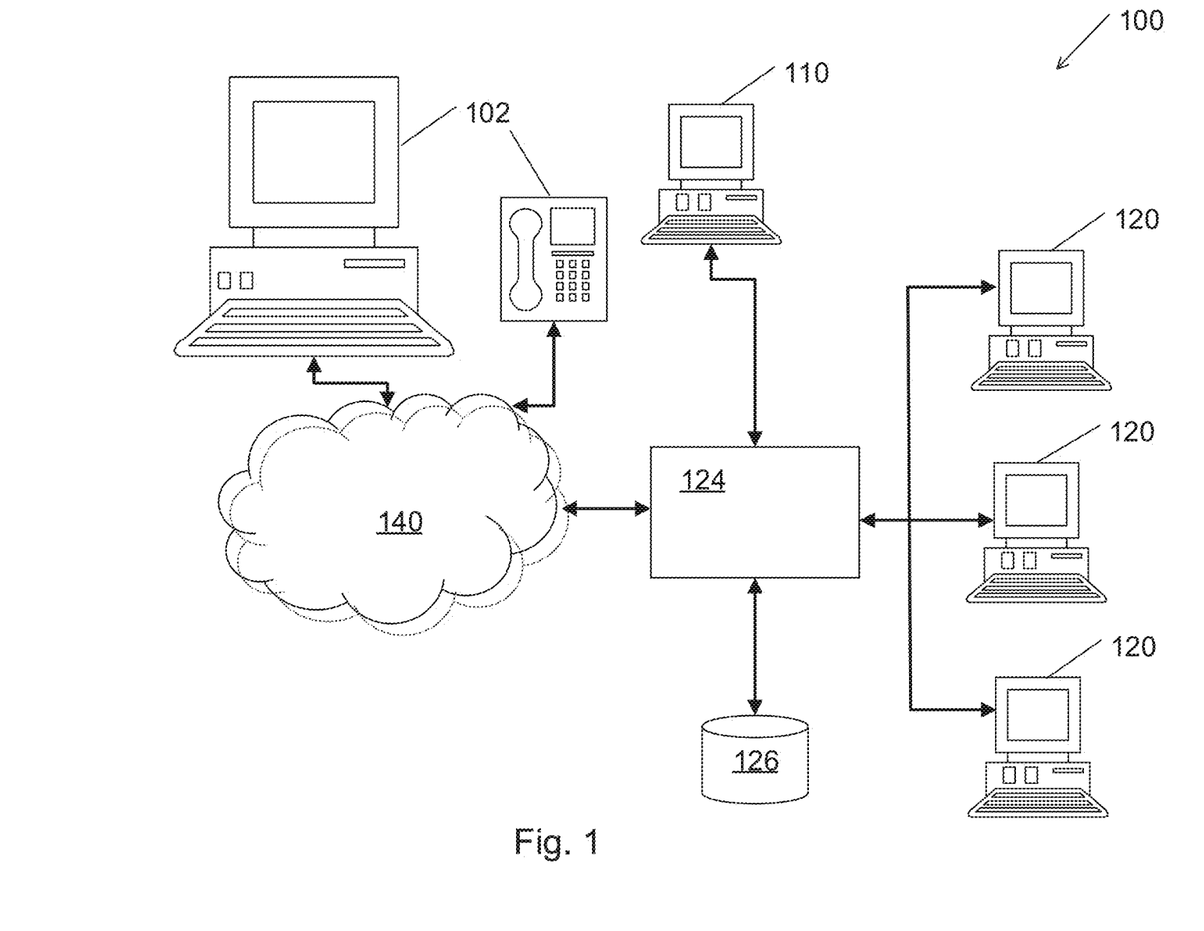
FIG. 1 schematically illustrates a system, according to embodiments of the invention.

Reference is made to FIG. 1, which schematically illustrates a system 100, according to embodiments of the invention. System 100 may include contact center 124 to connect customer devices 102 to agent devices 120. Contact center 124 may also be connected to supervisor device 110. Contact center 124 may be or may include company call centers for telephone-based support, or online support forums for Voice over IP (VoIP) Internet-based support, for example, to provide customers with technical support, sell products, schedule appointments, or otherwise interact or communicate with customers. Contact center 124 may include a switching station to order and connect each of a plurality of user devices 102 to one of a plurality of agent devices 120 at the same time. Contact center 124 may be configured to perform agent behavioral analytics for generating an agent profile as disclosed herein. Contact center 124 may be connected to database 126 for storing interactions or calls (e.g. conversations via telephone, VoIP, etc.) between users and agents via user devices 102 and agent's devices 120, and other data such as transcribed calls, features extracted from the call, an ML behavioral model for calculating behavioral analytics, calculated behavioral analytics, and any other relevant data.

According to some embodiments, calls or interactions may be recorded and stored in database 126, e.g., as way or mp3 files, or in any applicable format. Calls or interactions may be stored in multiple formats—e.g. a telephone call may be stored as both an audio file and a text transcript generated from the audio file. The calls may be fed as input into an ML behavioral model which may provide behavioral metrics that may be used to build a behavioral profile for an agent. In some embodiments, the behavioral profile may be tuned using feedback from a human operator, e.g., a supervisor, however, this is not mandatory, and the process may be fully automated. The generated behavioral profile may be displayed in a user interface (e.g., using output devices 745 depicted in FIG. 7) alongside other data and meta-data. The generated behavioral profile may be used to provide adaptive coaching, insights and goal management to the agent, based on the agent's behavioral analytics.

System 100 may be connected, or configured to be connected, to one or more user devices 102, such as, computers (for web or Internet voice connections), telephones (for telephone or radio network connections), for a customer to interact with and communicate with agents over one or more networks 140. Customers may use user devices 102 to connect to and communicate with live agents, for example, using or operating on agent devices 120 at contact center 124. System 100 may be connected, or configured to be connected, to one or more supervisor devices 102, such as, a computer for supervising agents.

Contact center 124 may be configured to generate a behavioral metric for evaluating an agent by training a ML model and using the trained model. During a training phase, contact center 124 may be configured to obtain a plurality of audio recordings of tagged calls between customers and agents, and a plurality of scores associated with each tagged call. Each score may grade a tagged call with respect to an attribute of a plurality of attributes. For each tagged call of the plurality of tagged calls, contact center 124 may be configured to obtain a score of the tagged call associated with an attribute of the plurality of attributes. Contact center 124 may be configured to transcribe the tagged call and calculate features of the tagged call based on the transcribed text of the tagged call and on the audio recordings of the tagged calls, as disclosed herein. Contact center 124 may be configured to train an ML model to produce a behavioral metric for each attribute of the plurality of attributes of a future call, based on the features of the tagged calls and the at least one score associated with each of the tagged calls.

During a runtime phase or period, contact center 124 may be configured to obtain an audio recording of an incoming call, transcribe the incoming call and calculate features for the incoming call based on the transcribed text of the incoming call and on the audio recording of the incoming call. Contact center 124 may be configured to use the trained machine learning model to produce grades of the agent in the incoming call for the attributes, based on the features of the incoming call. In some embodiments contact center 124 may obtain audio recordings and transcription of calls (both tagged and not tagged).

Figure 7:
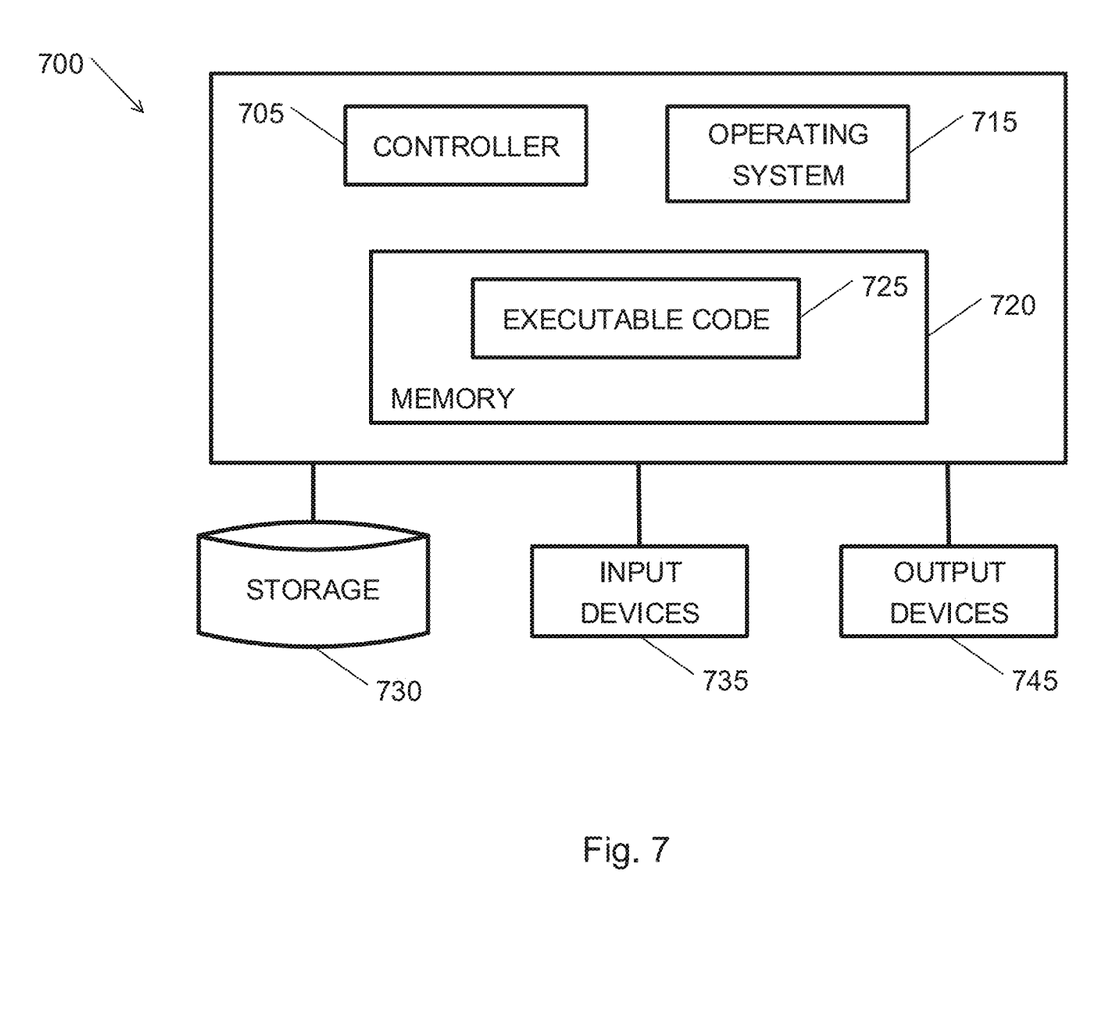
FIG. 7 is a high-level block diagram of an exemplary computing device, according to some embodiments of the present invention.

Each of user devices 102, supervisor device 110, contact center 124 and agent devices 120 may be or may include a computing device such as computing device 700 depicted in FIG. 7. Database 126 may be or may include a storage device such as storage device 730. Each of agent device 120 and supervisor device 110 may include a display (such as output device 745) for presenting an agent profile and input devices (such as input device 735).

Figure 2:
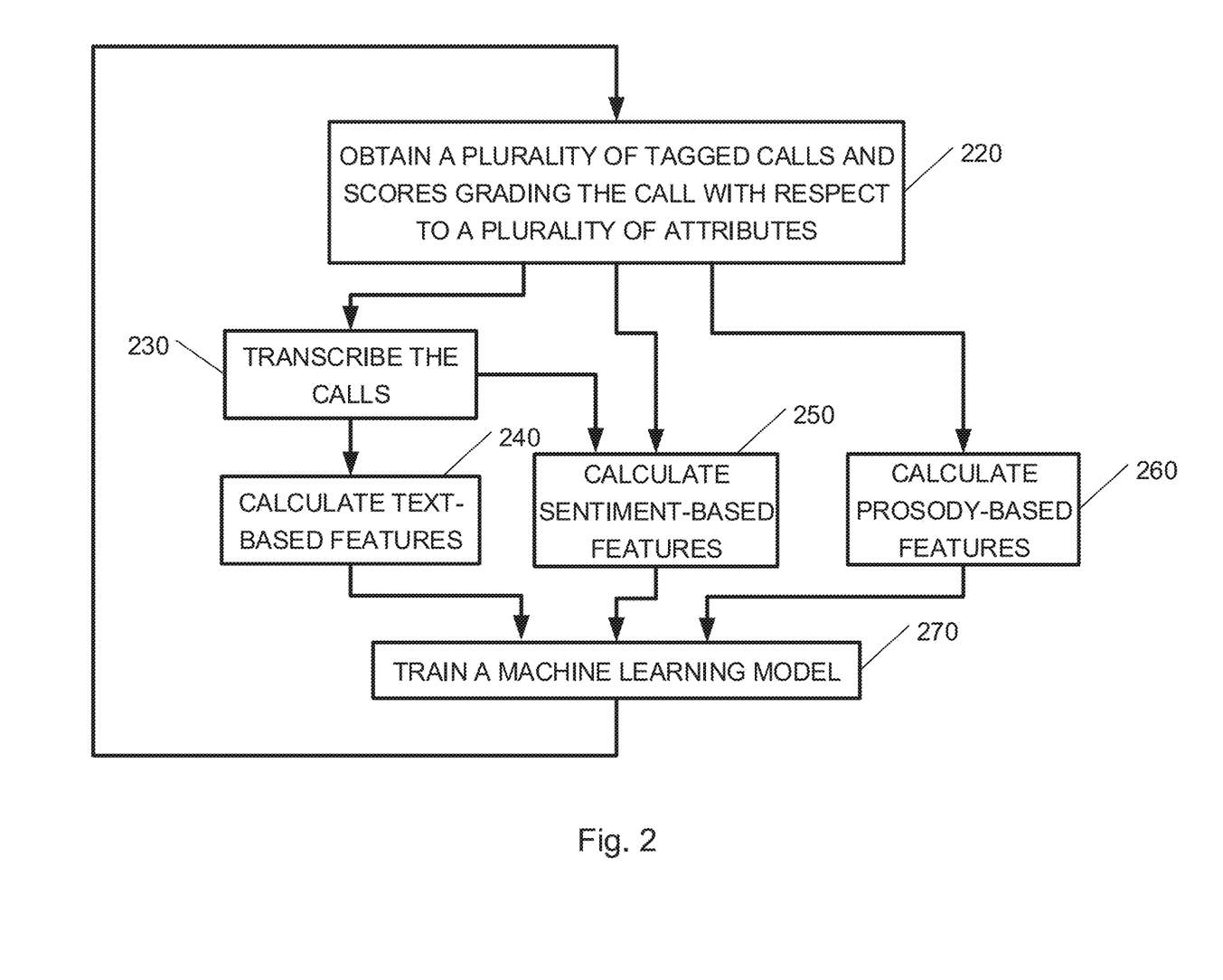
FIG. 2 is a flowchart of a method for training a machine learning behavioral model used for performing agent behavioral analytics during a training phase, according to embodiments of the present invention.

Reference is now made to FIG. 2 which is a flowchart of a method for training an ML behavioral model used for calculating agent behavioral analytics during a training phase, according to embodiments of the present invention. An embodiment of a method for training an ML behavioral model used for calculating agent behavioral analytics may be performed, for example, by contact center 124 presented in FIG. 1, but other hardware may be used.

In operation 220 a plurality of tagged calls may be obtained. In some embodiments 5000 tagged calls or above may be obtained. The training set may be balanced or not. The calls may be obtained as an audio recording of the call, in any applicable format. Each call may be tagged, e.g., associated with one or more behavioral labels, grades, scores or ratings. Each behavioral label, grade, score or rating may grade a call with respect to one attribute of a set of attributes or behavioral metrics. Thus, the call may be associated with a vector (e.g. an ordered list) of behavioral labels. For example, if eight attributes are used, the vector of behavioral labels may include eight entries, where each entry may hold a score of the call with relation to one attribute. The calls may be tagged by a human operator. The attributes or behavioral metrics may include personality traits or characteristics of an agent, as these are manifested in the call. For example, the attributes or behavioral metrics may include agreeableness, conscientiousness, emotional stability, extraversion, intellect, needs and values. Other attributes may be used. Thus, a human operator may grade each call of the set of tagged calls with respect to each attribute (or at least some attributes), and the call together with the vector of behavioral labels may be provided as a training set to an ML behavioral model. Typically, the grades or scores are numerical values, for example, a number from 0 to 10, but need not be limited as such.

Operations 230, 240, 250 and 260 may be repeated for each of the tagged calls. In operation 230, a tagged call may be transcribed, and in operation 240 text-based features of the call may be extracted from the transcription. For example, in operation 230 transcription may be performed by applying an automatic speech recognition (ASR) engine on the audio recording of the call to receive a list of words, organized according to the time they were said along with their time interval and confidence level. A word's confidence level is a score, e.g., between 0 and 1, which represents the amount of confidence the ASR engine has that the given word was said in the given time interval. Examples for text-based features will be given hereinbelow. In operation 240 some or all of the features listed herein may be extracted, as well as other features. Some of the text-based features are based on knowledge originated from the fields of linguistics and psychology.

According to embodiments of the invention the text-based features may include the following example features. The text-based features in the following list are divided to groups, however this division is conceptual only. Some or all of the following text-based features may be used, in any desired combination. The text-based features may include, for example:

a. Language complexity and coherence features—The language complexity and coherence features may capture whether the agent is articulating himself coherently or in an incoherent and complex way, based on the transcription of the text. The language complexity and coherence features may include, for example:

Number of types—a number of different distinct words in the transcribed text of the call.

Number of tokens—a total number of words in the transcribed text of the call.

Type-token ratio—a number of different words in the transcribed text of the call divided by a total number of words in the transcribed text of the call. The Type-token ratio may be relatively high if the agent uses a lot of different words and relatively low if the agent repeats the same words throughout the call.

Average word length in the transcribed text. The word length may refer to the number of characters in a word (for example the word "hello" has length of 5). Other measures for word length may be used.

Average sentence length in the transcribed text. The sentence length may refer to the number of words in a sentence. Other measures for sentence length may be used.

A number of unknown words—a number of words which the ASR engine was unable to decode, e.g., due to being very specific or rare words or due to an incoherent or unintelligible way the agent spoke when producing that word.

Average confidence level—the ASR engine outputs a confidence score, e.g., between 0 and 100, for every transcribed word. This score quantifies how certain the engine is in identifying the word. The average confidence level is an average of the confidence scores across all the words in the call.

A number of discourse markers—discourse markers may refer to words or phrases, e.g., anyway, right, OK, oh, well, now, then, you know, so, etc., that may be used to connect, organize and manage the discourse and may be a way to make a text more coherent. The discourse markers may be marked as such in the transcribed text by the ASR engine.

b. Call-flow features—the call flow features may model the general flow of the call. It should be readily understood that a full transcription may not be required for deriving at least some of the following features. For example, the silence ratio and the silence percent per chunk features may be derived using an automatic speech recognition (ASR) tool, without a full transcription. Call duration may be measured by the recorder.

Silence ratio, calculated by dividing total silent time in the call by the total call duration.

Agent activity ratio, calculated by dividing the total agent activity time by the total customer activity time.

Customer activity ratio, calculated by dividing the total customer activity time by the total customer activity time.

A plurality of silence percent per chunk features—the call may be split into a plurality of chunks or parts, e.g., into 4 chunks, of equal or not equal duration, and a feature for each chunk may be calculated by dividing a total silent time in the chunk by a total chunk time.

Call duration.

Disfluency features—the disfluency features may capture instances of disfluencies in the conversation (e.g., in a call). Disfluencies may refer to any form of breaks, irregularities or non-lexical vocables, including repetitions, repairs, false starts and fillers such as "huh", "uh", "hum", "so" like", etc. The disfluency features may include, for example:

i. Number of repeating unigram words. The repeating unigram words may be consecutive or not.

ii. Number of repeating bigram words (e.g., the number of repeating double words). The repeating bigram words may be consecutive or not.

iii. Number of repeating unigram part of speech (POS) tags (the repeating unigrams POS tags may be consecutive or not).

iv. Number of repeating bigrams POS tags. The repeating bigrams POS tags may be consecutive or not.

v. Number of filler words (e.g., um, uh, ah).

The above listed parameters (e.g., the number of repeating unigram words, number of repeating bigram words number of repeating unigram POS tags, number of repeating bigrams POS tags and number of filler words may be measured according to the entire part of the agent in the call, or in time windows, e.g., moving time windows. The features may be calculating by, for example, taking an average over the time windows, a median, a maximum value, etc. The size of the window may be defined in time (e.g., 30 seconds) or in number of words (e.g., a window duration of 10 words).

c. Rapport and empathy features: the rapport and empathy features may capture how emphatic the agent is, and whether the agent tries to build rapport with the customer. The rapport and empathy features may be based on dialog act (DA) analysis. A dialog act may refer to an utterance (e.g., a unit of speech that may be preceded by silence and followed by silence or a change of speaker) that may serve a function in a dialog. A dialog act may be tagged according to its function, e.g., statement, backchannel and acknowledgment, opinion, question, appreciation etc. Calculating the rapport and empathy features may include representing or mapping words and utterances as vectors (e.g., array of data elements, or an ordered list) of for example natural numbers in a word embedding space. The word embedding space may be a n-dimensional space where word vectors of similar words are closer to each other and dissimilar words have vectors far away from each other. Mapping words into vectors in the word embedding space may be performed using any applicable procedure. The rapport and empathy features may include:

Summarize and reformulate DA feature—the summarize and reformulate DA feature may be computed by calculating an embedding vector in a word-embedding space for words in the transcribed text of the call. A representation of an utterance of the agent or the customer in the word-embedding space may be calculated by summing the individual embedding vectors of words in the utterance. The conversation (or call) may be divided to utterance pairs, where an utterance pair may include a customer utterance directly followed by an agent's response utterance, and a similarity of the two utterance vectors in a customer-agent utterance pair may be measured, for example, using a cosine similarity metric. In some embodiments, more than one agent utterance may be included in an utterance pair, e.g., the similarity of the utterance vector of the customer and utterances vectors of more than one utterance of the agent may be measured. The similarity score may be calculated based on the measured similarities, e.g., the average similarity, the maximum similarity etc. Thus, a set of similarity scores may be produced by measuring a similarity of the vector representations of each pair of consecutive utterances of the agent and the customer. The reformulate dialog-act metric may be calculated based on the similarity scores. For example, a summarize and reformulate DA feature may include an average similarity of all customer-agent utterance pairs, or a maximum of all customer-agent utterance pairs or other metric based on the similarity scores. More than one summarize and reformulate DA feature may be used, e.g., both the average and the maximum may be used as summarize and reformulate DA features. The similarity score may be calculated using a cosine similarity metric according to, for example:

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

where A and B are the two utterance vectors in a customer-agent utterance pair, e.g., an utterance vector of the agent and the utterance vector of the customer in a customer-agent utterance pair. Other measures for the similarity may be used.

Repeat-phrase DA feature—number of matching unigrams and bigrams in the customer-agent utterance pair divided by total number of unigrams and bigrams in the pair. In some embodiments the repeat-phrase DA feature may equal the average over the customer-agent utterance pairs in a call. Matching unigrams and bigrams may include unigrams and bigrams that appear in an utterance of the customer, and then repeated in a defined level of accuracy in a consecutive utterance of the agent.

Backchannel DA feature—the backchannel DA feature may equal the number of times an agent responded in a backchannel phrase. Backchannel phrases may refer to phrases that are used in a conversation to verbalize the listener attention. Embodiments of the invention may use a list of non-lexical and phrasal backchannel phrases, expressions or words, such as "ok", "uh-ah", "oh right", and the number of agent utterances which contain words from that list may be counted. In some embodiments the entire response or utterance of the agent may be just the backchannel expressions (while in the discourse and disfluency features the phrase may be a part of an utterance). It is noted that some expressions or words may be counted as (some or all of) filler words, discourse markers and backchannel phrases.

In operation 250, sentiment-based features of the tagged call may be calculated. The sentiment-based features may model the sentiment of the customer and the reaction of the agent to changes in the sentiment of the customer throughout the call. The sentiment-based features may be generated using the transcribed text generated in operation 230, and the output of a sentiment engine. A sentiment engine may obtain the audio recording of the call and may use the audio recording of the call to produce, estimate or calculate a sentiment-score, e.g., in the range of −1 to 1, representing the amount of negative or positive sentiment in each time segment in the call, e.g., in each second of the call. The sentiment scores may be used to calculate sentiment-based features as listed herein. Other features may be calculated based on the sentiment scores. The sentiment-based features may include for example:

Overall customer sentiment feature—calculated by averaging a sentiment per time of the customer across the call.

Average sentiment per chunk features—calculated by splitting the call into a plurality of chunks, e.g., into four chunks, and averaging the estimate of the sentiment per time in each chunk. Thus, an average sentiment per chunk feature may be calculated for each chunk.

Adaptability features—one or more adaptability features may be calculated. The adaptability features may provide an estimate of how well the agent adapts his behavior to changes in sentiment of the customer. Changes in the sentiment of the customer may be manifested in the sentiment per time measure as peaks, e.g., minimum or maximum peaks. Thus, adaptability features may be calculated by finding an extremum, e.g., minimum and/or maximum peaks, in the estimate of the sentiment per time. For each extremum a feature vector of the agent speech within a time interval, e.g., one minute, before the extremum and a feature vector of the agent speech within a time interval after the extremum may be constructed. The feature vector may include some or all of the features listed herein. A similarity between the feature vector of the agent speech before the extremum and the feature vector of the agent speech after the extremum may be measured, calculated or estimated, e.g., using cosine similarity metric. Others similarity measures may be used. An adaptability feature may equal the estimated similarity.

Figure 4:
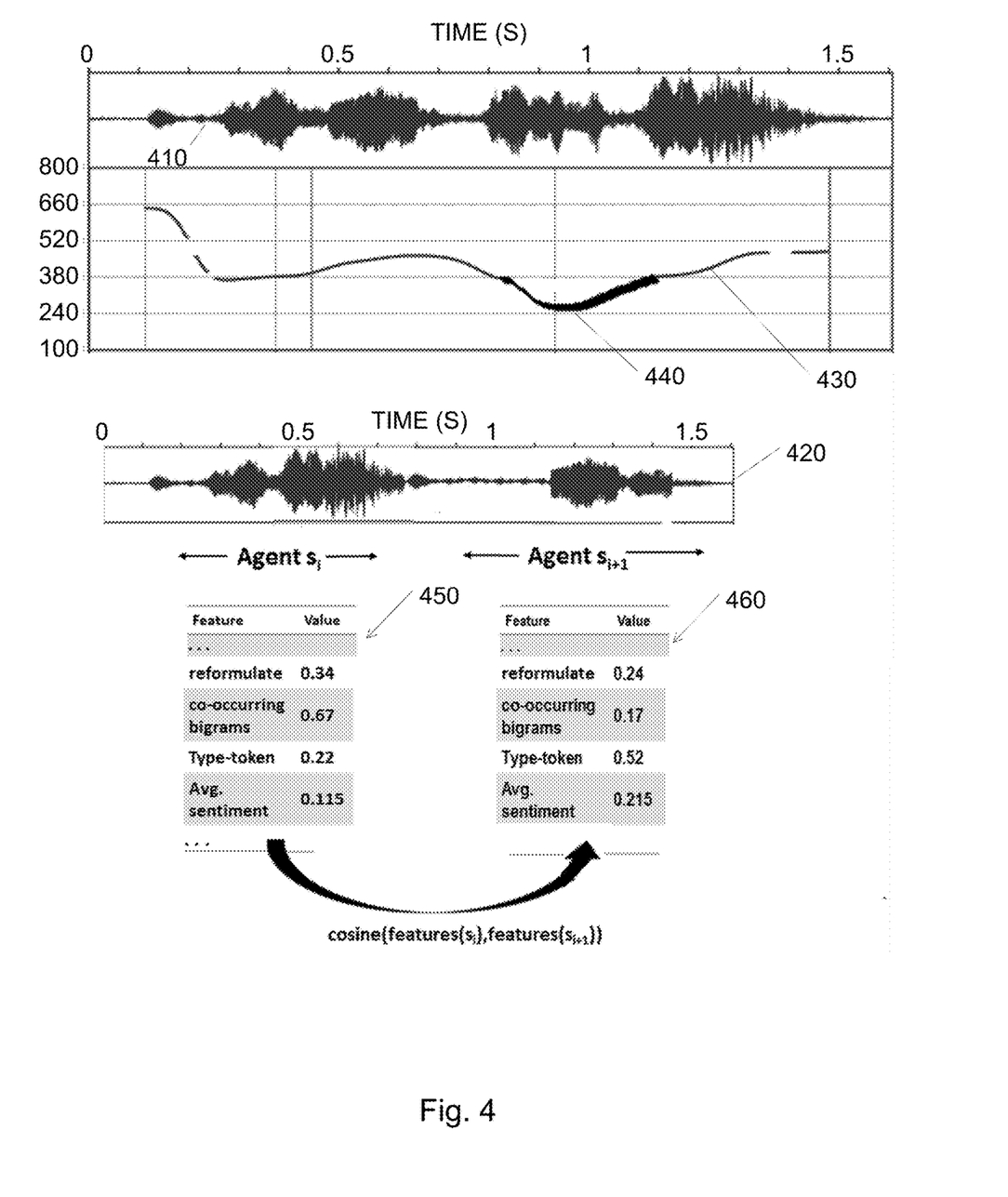
FIG. 4 depicts a graph of sentiment over time helpful in demonstrating embodiments of the invention.

Reference is now made to FIG. 4 depicting a graph of sentiment over time helpful in demonstrating embodiment of the invention. FIG. 4 presents the audio recording of a customer 410 and an agent 420 and the sentiment of the customer per time 430 in the call. As can be seen there is a drop in the sentiment around minimum point 440. Thus, a feature vector 450 of the agent speech within one minute before minimum point 440 and a feature vector 460 of the agent speech within a time interval after the extremum may be constructed. An adaptability feature may be calculated by estimating the similarity between the feature vector 450 of the agent speech before minimum point 440 and the feature vector 460 of the agent speech after minimum point 440, cosine similarity metric.

In operation 260 prosody-based features of the tagged call may be calculated. The prosody-based features may be selected from a prosody features generated by a prosody engine. Prosody-based features may be extracted, for example, using the open-source openSMILE feature extraction tool. In some embodiments, the items listed in Table 1, extracted by pyAudioAnalysis package described in https://github.com/tyiannak/pyAudioAnalysis/wiki/3.-Feature-Extraction may be used

TABLE 1 an example of prosody-based features.

| Feature ID | Feature Name | Description |
|---|---|---|
| 1 | Zero Crossing Rate | The rate of sign-changes of the signal during the duration of a particular frame. |
| 2 | Energy | The sum of squares of the signal values, normalized by the respective frame length. |
| 3 | Entropy of Energy | The entropy of sub-frames' normalized energies. It can be interpreted as a measure of abrupt changes. |
| 4 | Spectral Centroid | The center of gravity of the spectrum. |
| 5 | Spectral Spread | The second central moment of the spectrum. |
| 6 | Spectral Entropy | Entropy of the normalized spectral energies for a set of sub-frames. |
| 7 | Spectral Flux | The squared difference between the normalized magnitudes of the spectra of the two successive frames. |
| 8 | Spectral Rolloff | The frequency below which 90% of the magnitude distribution of the spectrum is concentrated. |
| 9-21 | MFCCs | Mel Frequency Cepstral Coefficients form a cepstral representation where the frequency bands are not linear but distributed according to the mel-scale. |
| 22-33 | Chroma Vector | A 12-element representation of the spectral energy where the bins represent the 12 equal-tempered pitch classes of western-type music (semitone spacing). |
| 34 | Chroma Deviation | The standard deviation of the 12 chroma coefficients. |

In operation 270, a machine learning (ML) behavioral model may be trained to produce scores for behavioral metrics or attributes of a future call, based on the text-based features of the tagged calls, the sentiment-based features of the tagged calls, the prosody-based features of the tagged calls and the at least one score associated with each of the tagged calls. The ML behavioral model may be trained to obtain a feature list of a call and provide grades with respect to the set of attributes, e.g., the ML behavioral model may be trained to provide a grade per each attribute of the set of attributes. Training the ML behavioral model using calls of the training-set may involve providing the features of each tagged call from the training set along with a vector of behavioral labels of the tagged call, and adjusting weights and model parameters using the features of the tagged calls as inputs to the ML behavioral model and the vector of behavioral labels as outputs of the ML behavioral model. The ML model may be for example a random forests (RF) and decision trees neural network ML model types, implemented using one or more computer processors, for example as shown in FIG. 7. It is noted that the training phase may be on-going, e.g., embodiments of the invention may continue to obtain tagged calls even after the behavioral ML model is trained, and may continue to train or adjust model parameters based on the new tagged calls. This is demonstrated in FIG. 2 by the arrow connecting operation 270 to operation 220. For example, some of the incoming calls that are analyzed by the trained ML model in operation 320 depicted in FIG. 3 may be labeled by a human operator and provided as tagged calls to operation 220 to tune and adjust the model parameters.

According to embodiments of the invention, more than one ML behavioral model type may be trained. For example, random forests (RF) and decision trees ML model types may be trained. Both RF and decision trees ML models support multi-label applications, e.g., both RF and decision trees ML models may be trained to provide one or more grades or rating, for example, a grade per attribute. Training each ML model may include performing parameter and hyper parameter tuning. If a plurality of models are trained in operation 270 the best model may be selected for future prediction of agent's profile. The model may be selected by tuning the model parameters, applying the model to the training set and comparing the prediction of each model to the known labels, tags or grades. The model that provides the most accurate results may be selected. In some embodiments, two sets of tagged calls may be used, one for training the models and one for testing the models.

Random forests may refer to a method for classification, regression and other tasks, that may construct a plurality of decision trees at a training phase and may output the class that is the majority of the classes (classification) or mean prediction (regression) of the individual leaves in the trees at runtime. Generating a random forest model may include creating a plurality of individual decision trees based on a training set, where each tree is constructed to be slightly different from the other trees in the forest. The variation in the decision trees may be accomplished by introducing random variation into the process of building the trees. For example, each tree may be build using a subgroup of the training set and a subgroup of the features, both may be selected randomly. Random forest may be adapted to work as a multi-label regressor by randomly selecting one of the output attributes and then follow the usual random forest approach.

A decision tree may refer to a representation of possible solutions to a decision problem, based on certain conditions. A decision tree may start at a single root node, that may branch off into a plurality of solutions, represented child nodes that may form a level of the tree and may further branch to child nodes and so on. At a training phase, a set of questions may be considered at each node, that may partition the training data set. The question that provides the best split, e.g., in terms of maximizing the information gain or minimizing the class purity, may be selected and the process may be repeated at each node at each tree level, until a stopping criteria is meet, e.g., until all node data after a split is of the same class, until maximum depth or maximum number of trees are reached, etc.

Training each ML behavioral model may include performing parameter and hyper-parameter tuning. In order to find optimal parameters and hyper-parameters of an ML behavioral model, experiments may be performed on the training set and a configuration which achieves the best results may be selected. For example, a mean squared error metric may be used to evaluate the results of each model with respect to the provided vector of behavioral labels and the parameters that provide the minimal cumulative (e.g., accrues the training set) mean squared error may be selected. According to some embodiments, the following example parameters may be tuned:

window size, in terms of time or word count, for calculating disfluency features.

number of agent utterances to consider when calculating the summarize and reformulate DA feature.

According to some embodiments, the following example hyper-parameters of the ML behavioral models may be tuned:

For RF ML model: max-depth, number of trees and number of features to use at each split.

For decision trees ML model: max-depth and number of features to use at each split.

The best ML behavioral model may be selected after the tuning process and the selected model may be used as a model for performing agent behavioral analytics.

Figure 3:
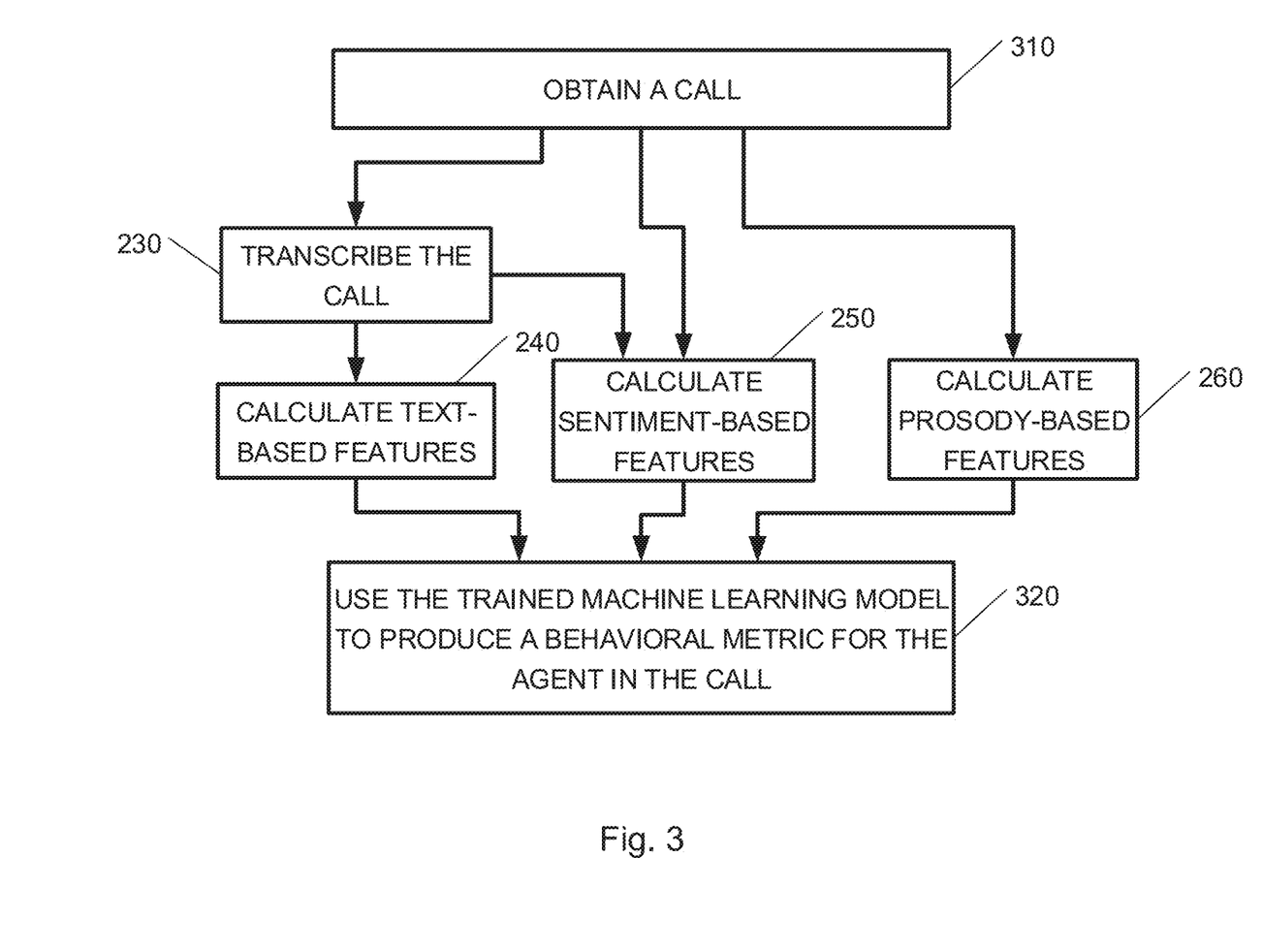
FIG. 3 is a flowchart of a method for using the machine learning behavioral model for performing agent behavioral analytics during a runtime phase, according to embodiments of the present invention.

Reference is now made to FIG. 3 which is a flowchart of a method for using an ML behavioral model for calculating agent behavioral analytics during a runtime phase, according to embodiments of the present invention. An embodiment of a method for using an ML behavioral model for calculating agent behavioral analytics may be performed, for example, by contact center 124 presented in FIG. 1, but other hardware may be used. An embodiment of a method for using an ML behavioral model for calculating agent behavioral analytics may be performed to evaluate agents during a runtime phase (e.g. "inference") for incoming calls.

In operation 310 an incoming call may be obtained. The incoming call may be obtained in the form of an audio recording of the call, in any applicable format. Operations 230, 240, 250 and 260 may be similar to operations with the same reference numeral in FIG. 2. In operation 230 the incoming call may be transcribed (e.g. text of the call may be produced, typically by a computerized process), and in operation 240 text-based features of the incoming call may be calculated based on the transcribed text of the incoming call. In operation 250 sentiment-based features of the incoming call may be calculated and in operation 260 prosody-based features of the incoming call may be calculated. The same type of text-based features, sentiment-based features and prosody-based features may be extracted, using similar operations in the runtime phase and in the training phase or period. In operation 320, the trained ML behavioral model may be used to produce grades, ranks or scores of the agent in the incoming call for the set of attributes or behavioral metrics, based on the text-based features of the incoming call, the sentiment-based features of the incoming call and the prosody-based features of the incoming call. The grades, ranks or scores of the set of attributes may constitute the result of the behavioral analytics of the agent, e.g., the result of the behavioral analytics of an agent may include a set of grades, ranks or scores, each calculated by the trained ML behavioral model, and each measures the agent with relation to an attribute. The trained ML behavioral model may be the trained ML behavioral model selected and trained in operation 270, e.g., the ML behavioral model may provide a grade per each attribute of the set of attributes.

Figure 5:
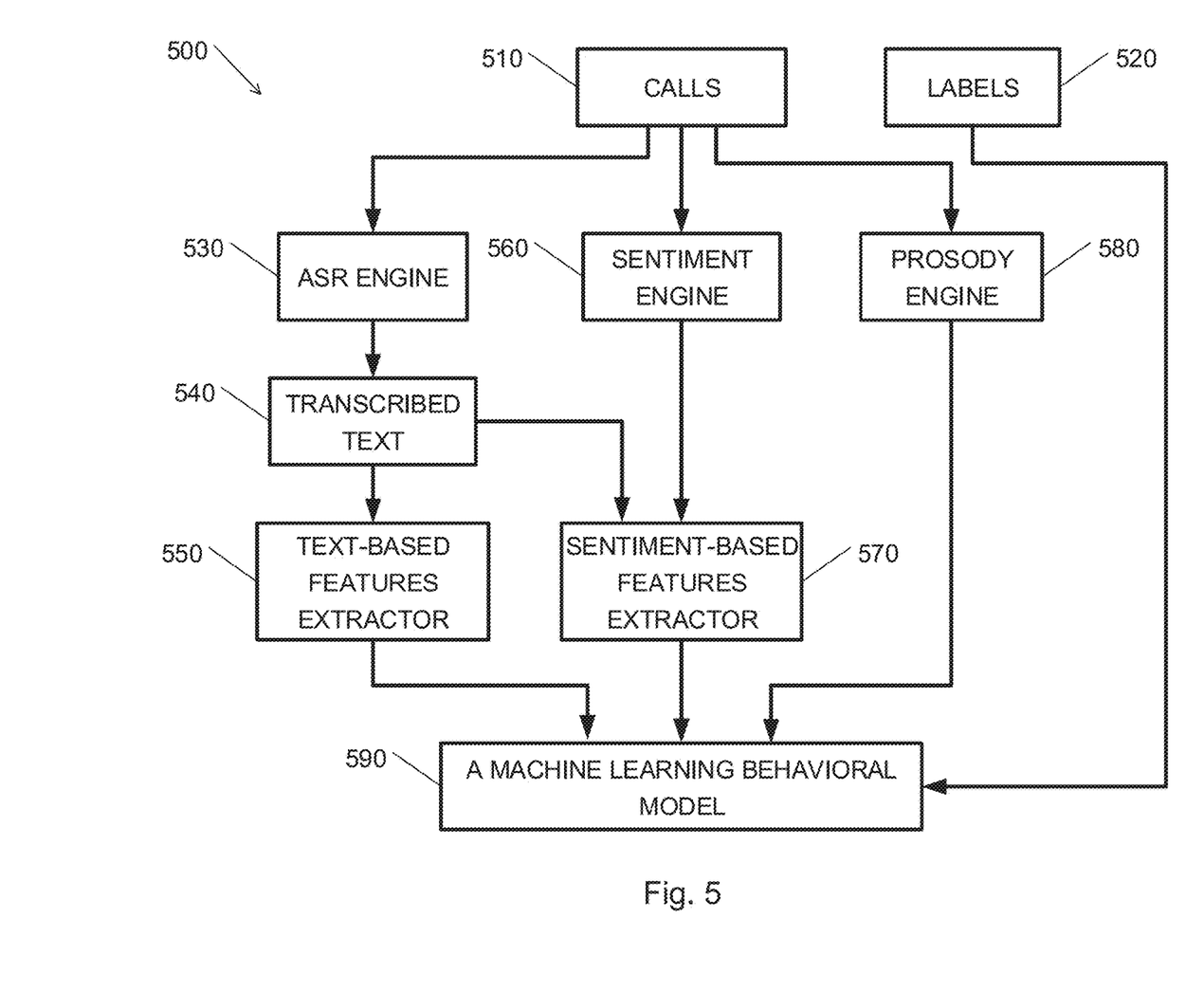
FIG. 5 depicts a system for using a machine learning model for performing agent behavioral analytics, according to embodiments of the present invention.

Reference is now made to FIG. 5 which depicts a system 500 for using a machine learning model for performing agent behavioral analytics, according to embodiments of the present invention. The various modules depicted in FIG. 5 may be for example processes executed for example by components of a system as shown in FIG. 1. For example, ASR engine 530, text-based feature extractor 550, sentiment engine 560, sentiment-based feature extractor 570, prosody engine 580 and the ML behavioral model 590 may be partially or fully included in contact center 124.

System 500 may obtain calls 510, e.g., an audio recording of a call. Calls that pertain to a training set may be obtained with behavioral labels, grades, scores or ratings 520 that may grade a call with respect to one attribute of a set of attributes or behavioral metrics. ASR engine 530 may transcribe calls 510 to produce a transcribed text 540 of calls 510. Text-based feature extractor 550 may extract text-based features from calls 510 based on transcribed text 540 as disclosed herein. Sentiment engine 560 may obtain the audio recording of calls 510 and may use the audio recording of calls 510 to produce, estimate or calculate a sentiment-score, e.g., in the range of −1 to 1, representing the amount of negative or positive sentiment in each time segment in a call 510, e.g., in each second of a call 510. Sentiment-based feature extractor 570 may use transcribed text 540 and the sentiment-score to calculate sentiment-based features as disclosed herein. Prosody engine 580 may generate prosody-based features based on audio recording of calls 510 as disclosed herein. In a training phase, an ML behavioral model 590 may be trained using the text-based features, the sentiment-based features, the prosody-based features and the at least one behavioral labels 520 associated with the tagged calls. During runtime, ML behavioral model 590 may be used to produce grades, ranks or scores of the agent in an incoming call 310 for the set of attributes or behavioral metrics, based on the text-based features, the sentiment-based features and the prosody-based features of the incoming call 510.

Figure 6:
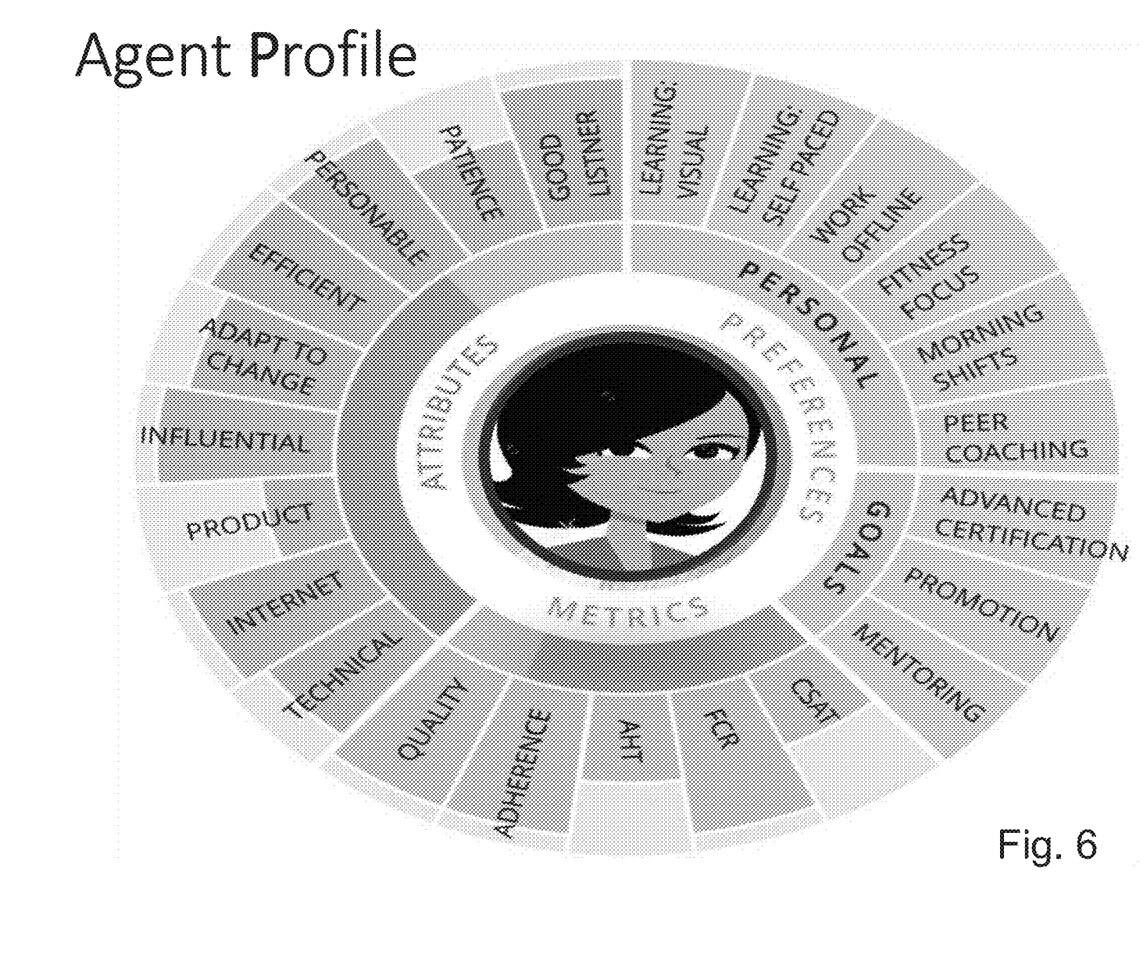
FIG. 6 shows a user interface depicting a behavioral profile of an agent, according to embodiments of the invention.

Reference is made to FIG. 6, showing a user interface depicting a behavioral profile of an agent, according to embodiments of the invention. At least some of the components in FIG. 6. Specifically, agreeableness, conscientiousness, emotional stability, extraversion, intellect, needs and values may be generated using the ML behavioral model as disclosed herein.

An example embodiment of the invention was tested to evaluate the accuracy of the estimations generated by the trained behavioral ML model during runtime. The evaluation was performed by comparing the results of the trained behavioral ML model to two baseline classifiers:

1. A random classifier—each call is randomly given either a positive or negative label with probability 0.5 for each.
2. A majority classifier—all calls are given the majority class label (in our case 1 or "positive call")

The results of the comparison are presented in Table 2. Precision is the fraction of calls which were tagged (e.g., by a user) as positive and classified by the classifier as positive, divided by the total number of calls classified as positive (e.g., the denominator includes also the negative calls that were classified as positive). Recall is the fraction of calls that were tagged as positive and classified as positive, divided by the number of calls that were tagged as positive. Accuracy is the fraction of calls which were tagged as positive and classified by the classifier as positive plus the calls which were tagged as negative and classified by the classifier as negative, divided by the total number of calls. The range is between 0 to 1, the higher the result, the better is the precision, the recall or the accuracy of the tested classifier.

TABLE 2 example results of comparing predictions of the
trained behavioral ML model, a random
classifier and a majority classifier.

| Classifier | Precision | Recall | Accuracy |
|---|---|---|---|
| Random | 0.502 | 0.502 | 0.491 |
| Majority | 0.231 | 0.5 | 0.497 |
| trained ML behavioral model | 0.646 | 0.6404 | 0.648 |

It can be seen that the predictions of the trained behavioral ML model outperform the other baseline classifiers with a statistically significant margin.

Additionally, a feature analysis was performed to evaluate the contribution or importance of each features. The first part feature analysis estimates the average feature importance in the Random Forest ML model. Table 3 shows the top 10 most important features e.g., the features providing highest information gain. The importance was calculated using built-in functions from the scikit-learn python package (http://scikit-learn.org/stable/index.html).

TABLE 3 the top 10 most important features.

| Feature | Feature importance |
|---|---|
| Number of discourse markers | 0.148157 |
| Adaptability | 0.101762 |
| Number of filler words | 0.057411 |
| Average word length | 0.057233 |
| Backchannel DA | 0.045487 |
| number of types | 0.037204 |
| Number of repeating unigram POS tags within a window | 0.033558 |
| Number of tokens | 0.032445 |
| Call Duration | 0.030315 |
| Number of repeating higrams POS tags within a window | 0.029819 |

A second method used to evaluate the contribution of each feature includes performing recursive feature elimination; at each iteration a feature analysis is performed to estimate the average feature importance, and the feature with the lowest importance is removed. The analysis is repeated until no features are left. Table 3 provides a list of the ten most significant features ordered by their importance according to the recursive feature elimination method.

TABLE 3 an example list of the ten most significant features
ordered by their importance according to the
recursive feature elimination method.

| Feature Rank | Feature Name |
|---|---|
| 1 | Number of discourse markers |
| 2 | Average word length |
| 3 | Adaptability |
| 4 | Call Duration |
| 5 | Number of filler words |
| 6 | Number of repeating unigram POS tags within a window |
| 7 | number of types |
| 8 | Customer activity in ratio |
| 9 | Average confidence words |
| 10 | Backchannel DA |

As evident from the above tables, Markers, adaptability and average word length appear as the top most contributing features in both evaluation methods, in one example.

Reference is made to FIG. 7, showing a high-level block diagram of an exemplary computing device according to some embodiments of the present invention. Computing device 700 may include a processor or controller 705 that may be, for example, a central processing unit processor (CPU), a graphics processing unit (GPU), a chip or any suitable computing or computational device, an operating system 715, a memory 720, executable code 725, storage or storage device 730, input devices 735 and output devices 745. Controller 705 may be configured to carry out methods described herein, and/or to execute or act as the various modules, units, etc., for example by executing code or software. More than one computing device 700 may be included. Multiple processes discussed herein may be executed on the same controller. For example, contact center 124 presented in FIG. 1, and agent module 210, supervisor module 220 and may be implemented by one or more controllers 705.

Operating system 715 may be or may include any code segment (e.g., one similar to executable code 725 described herein) designed and/or configured to perform tasks involving coordination, scheduling, arbitration, supervising, controlling or otherwise managing operation of computing device 700, for example, scheduling execution of software programs or enabling software programs or other modules or units to communicate. Operating system 715 may be a commercial operating system.

Memory 720 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 720 may be or may include a plurality oft possibly different memory units. Memory 720 may be a computer or processor non-transitory readable medium, or a computer non-transitory storage medium, e.g., a RAM.

Executable code 725 may be any executable code, e.g., an application, a program, a process, task or script. Executable code 725 may be executed by controller 705 possibly under control of operating system 715. For example, executable code 725 may be an application that when executed performing agent behavioral analytics as further described herein. Although, for the sake of clarity, a single item of executable code 725 is shown in FIG. 7, a system according to embodiments of the invention may include a plurality of executable code segments similar to executable code 725 that may be loaded into memory 720 and cause controller 705 to carry out methods described herein. For example, units or modules described herein may be, or may include, controller 705 and executable code 725.

Storage device 730 may be any applicable storage system, e.g., a disk or a virtual disk used by a VM. Storage 730 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content or data may be stored in storage 730 and may be loaded from storage 730 into memory 720 where it may be processed by controller 705. In some embodiments, some of the components shown in FIG. 7 may be omitted. For example, memory 720 may be a non-volatile memory having the storage capacity of storage 730. Accordingly, although shown as a separate component, storage 730 may be embedded or included in memory 720.

Input devices 735 may be or may include a mouse, a keyboard, a touch screen or pad or any suitable input device. It will be recognized that any suitable number of input devices may be operatively connected to computing device 700 as shown by block 735. Output devices 745 may include one or more displays or monitors, speakers and/or any other suitable output devices. It will be recognized that any suitable number of output devices may be operatively connected to computing device 700 as shown by block 745. Any applicable input/output (I/O) devices may be connected to computing device 700 as shown by input devices 735 and output devices 745. For example, a wired or wireless network interface card (NIC), a printer, a universal serial bus (USB) device or external hard drive may be included in input devices 735 and/or output devices 745.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 720, computer-executable instructions such as executable code 725 and a controller such as controller 705.

The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 720 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 705), a plurality of input units, a plurality of output units, a plurality of memory units, and a plurality of storage units. A system according to some embodiments of the invention may additionally include other suitable hardware components and/or software components. In some embodiments, a system may include or may be, for example, a personal computer, a desktop computer, a laptop computer, a workstation, a server computer, a network device, or any other suitable computing device. For example, a system according to some embodiments of the invention as described herein may include one or more devices such as computing device 700.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus, certain embodiments may be combinations of features of multiple embodiments.

What is claimed is:

1. A method for generating a behavioral metric for evaluating an agent in a call center, the method comprising:
during a training phase:
obtaining, by a processor, a plurality of audio recordings of tagged calls between customers and agents, and a plurality of scores associated with each tagged call of the plurality of tagged calls, each score grading a tagged call with respect to an attribute of a plurality of attributes;
for each tagged call of the plurality of tagged calls:
for each attribute of an at least one attribute, obtaining, by the processor, a score of the tagged call associated with the attribute; and
transcribing, by the processor, the call using automatic speech recognition and calculating features of the tagged call based on the transcribed text of the tagged call and on the audio recordings of the tagged calls; and
training, by the processor, a neural network implemented machine learning model to produce a behavioral metric for each attribute of the at least one attribute of a future call, based on the features of the tagged calls and the at least one score associated with each of the tagged calls;
during a runtime phase, for an incoming call:
obtaining, by the processor, an audio recording of the call;
transcribing, by the processor, the incoming call and calculating features for the incoming call based on the transcribed text of the incoming call and on the audio recording of the call, wherein the features of a call of the tagged calls and the incoming call comprise a reformulate dialog-act feature, and
calculating the reformulate dialog-act feature by the processor by:
calculating an embedding vector in a word-embedding space for each word in the transcribed text of the call;
dividing the text to utterances of the agent and utterances of the customer;
summing the individual embedding vectors for each word in an utterance to obtain a vector representation of each utterance of a customer and the agent in the word-embedding space;

producing a set of similarity scores by measuring a similarity of the vector representations of each pair of consecutive utterances of the agent and the customer; and calculating the reformulate dialog act metric based on the similarity scores; and using, by the processor, the trained neural network implemented machine learning model to produce a grade for the agent in the incoming call for each of the at least one attribute, based on the features of the incoming call.

2. The method of claim 1, wherein the features of a call of the tagged calls and the incoming call comprise prosody-based features.

3. The method of claim 1, wherein measuring the similarity of the vector representations is performed using a cosine similarity metric $$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

where A and B are the two utterance vectors in a customer-agent utterance pair.

4. The method of claim 1, wherein calculating the reformulate dialog-act metric comprises one of:
calculating an average of the similarity measures; and
taking a maximum.

5. The method of claim 1, wherein the features further comprise at least one of:
number of types,
number of tokens,
type-token ratio calculated by dividing a number of different words in the transcribed text of the call by a total number of words in the transcribed text of the call,
average word length,
average sentence length,
number of words that could not be decoded during transcription,
average confidence level,
number of discourse markers,
silence ratio calculated by dividing total silent time in the call by a total call duration,
an agent activity ratio, calculated by dividing a total agent activity time by a total customer activity time in the call,
a customer activity ratio, calculated by dividing a total customer activity time by a total customer activity time in the call,
a plurality of silence percent per chunk features, wherein a silence percent per chunk feature is calculated by splitting the call to a plurality of chunks and calculating a feature for each chunk by dividing a total silent time in the chunk by a total chunk time,
call duration,
number of repeating unigrams words within a window,
number of repeating unigrams part-of-speech tags within a window,
number of filler words;
number of repeating bigrams words within a window,
number of repeating bigrams part-of-speech tags within a window, and
number of filler words.

6. The method of claim 1, wherein the features further comprise at least one of:
a repeat-phrase dialog-act feature calculated by dividing a number of matching unigram and bigrams in the pair by a total number of unigrams and bigrams in the pair; and
a back-channel dialog-act feature, wherein the back-channel dialog-act feature equals the number of utterances in which the agent says a word out of a list of back-channel words.

7. The method of claim 1, wherein the features of a call of the tagged calls and the incoming call comprise sentiment-based features, wherein calculating the sentiment-based features comprises generating an estimate of the sentiment per time in the call, wherein the sentiment-based features of the call comprise at least one of:
overall customer sentiment feature calculated by averaging the estimate of the sentiment of the customer per time across the call,
a plurality of average sentiment per chunk features, calculated by splitting the call into a plurality of chunks and averaging the estimate of the sentiment per time in each chunk, and
a plurality of adaptability features, wherein an adaptability feature is calculated by:
finding an extremum in the estimate of the sentiment per time;
constructing a feature vector for the agent speech within a time interval before and after the extremum; and
measuring a similarity between the feature vector of the agent speech before the extremum and the feature vector of the agent speech after the extremum.

8. The method of claim 7, wherein measuring the similarity of the feature vector for the agent speech before the extremum and the feature vector for the agent speech after the extremum is performed using a cosine similarity metric.

9. The method of claim 1, comprising performing at least one of:
generating goals for the agent according to the behavioral metric; and
providing a coaching program for the agent based on the behavioral metric.

10. The method of claim 1, comprising presenting the behavioral metric of the agent to a supervisor.

11. A system for calculating availability points for workforce scheduling, the system comprising:
a memory; and
a processor configured to:
during a training phase:
obtain a plurality of audio recordings of tagged calls between customers and agents, and a plurality of scores associated with each tagged call of the plurality of tagged calls, each score grading a tagged call with respect to an attribute of a plurality of attributes;
for each tagged call of the plurality of tagged calls:
for each attribute of an at least one attribute, obtain a score of the tagged call associated with the attribute; and
transcribe the call using automatic speech recognition and calculate features of the tagged call based on the transcribed text of the tagged call and on the audio recordings of the tagged calls; and
train a neural network implemented machine learning model to produce a behavioral metric for each attribute of the at least one attribute of a future call, based on the features of the tagged calls and the at least one score associated with each of the tagged calls;
during a runtime phase, for an incoming call:
obtain an audio recording of the call;
transcribe the incoming call and calculate features for the incoming call based on the transcribed text of the incoming call and on the audio recording of the call, wherein the features of a call of the tagged calls and the incoming call comprise a reformulate dialog-act feature, and wherein the processor is configured to calculate the reformulate dialog-act feature by:
calculating an embedding vector in a word-embedding space for each word in the transcribed text of the call;
dividing the text to utterances of the agent and utterances of the customer;
summing the individual embedding vectors for each word in an utterance to obtain a vector representation of each utterance of a customer and the agent in the word-embedding space;
producing a set of similarity scores by measuring a similarity of the vector representations of each pair of consecutive utterances of the agent and the customer; and
calculating the reformulate dialog act metric based on the similarity scores; and
use the trained neural network implemented machine learning model to produce a grade for the agent in the incoming call for each of the at least one attribute, based on the features of the incoming call.

12. The system of claim 11, wherein calculating the reformulate dialog-act metric comprises one of:
calculating an average of the similarity measures; and
taking a maximum.

13. The method of claim 11, wherein the features further comprise at least one of:
number of types,
number of tokens,
type-token ratio calculated by dividing a number of different words in the transcribed text of the call by a total number of words in the transcribed text of the call,
average word length,
average sentence length,
number of words that could not be decoded during transcription,
average confidence level,
number of discourse markers,
silence ratio calculated by dividing total silent time in the call by a total call duration,
an agent activity ratio, calculated by dividing a total agent activity time by a total customer activity time in the call,
a customer activity ratio, calculated by dividing a total customer activity time by a total customer activity time in the call,
a plurality of silence percent per chunk features, wherein a silence percent per chunk feature is calculated by splitting the call to a plurality of chunks and calculating a feature for each chunk by dividing a total silent time in the chunk by a total chunk time, call duration,
number of repeating unigrams words within a window,
number of repeating unigrams part-of-speech tags within a window,
number of filler words;
number of repeating bigrams words within a window,
number of repeating bigrams part-of-speech tags within a window, and
number of filler words.

14. The method of claim 11, wherein the features further comprise at least one of:
repeat-phrase dialog-act feature calculated by dividing a number of matching unigram and bigrams in the pair by a total number of unigrams and bigrams in the pair; and
back-channel dialog-act feature, wherein the back-channel dialog-act feature equals the number of utterances in which the agent says a word out of a list of back-channel words.

15. The system of claim 11, wherein the features of a call of the tagged calls and the incoming call comprise sentiment-based features, wherein the processor is configured to calculate the sentiment-based features by generating an estimate of the sentiment per time in the call, wherein the sentiment-based features of the call comprise at least one of:
overall customer sentiment feature calculated by averaging the estimate of the sentiment of the customer per time across the call,
a plurality of average sentiment per chunk features, calculated by splitting the call into a plurality of chunks and averaging the estimate of the sentiment per time in each chunk, and
a plurality of adaptability features, wherein an adaptability feature is calculated by:
finding an extremum in the estimate of the sentiment per time;
constructing a feature vector for the agent speech within a time interval before and after the extremum; and
measuring a similarity between the feature vector of the agent speech before the extremum and the feature vector of the agent speech after the extremum.

16. The system of claim 11, wherein the features of a call of the tagged calls and the incoming call comprise prosody-based features.

17. The system of claim 11, wherein the processor is configured to perform at least one of:
generating goals for the agent according to the behavioral metric; and
providing a coaching program for the agent based on the behavioral metric.

18. The system of claim 11, comprising a display for presenting the behavioral metric of the agent to a supervisor.

* * * * *